United States Patent
Choi et al.

(10) Patent No.: US 6,741,317 B2
(45) Date of Patent: May 25, 2004

(54) LIQUID CRYSTAL DISPLAY DEVICE HAVING INJECTION PORTS AND LIQUID CRYSTAL INJECTION METHOD

(75) Inventors: Su Seok Choi, Hanam (KR); Suk Won Choi, Anyang (KR)

(73) Assignee: LG. Philips LCD Co., Ltd., Seoul (KR)

( * ) Notice: Subject to any disclaimer, the term of this patent is extended or adjusted under 35 U.S.C. 154(b) by 30 days.

(21) Appl. No.: 09/982,837

(22) Filed: Oct. 22, 2001

(65) Prior Publication Data
US 2002/0047981 A1 Apr. 25, 2002

(30) Foreign Application Priority Data
Oct. 20, 2000 (KR) .......................... 2000-61968

(51) Int. Cl.[7] .................. G02F 1/1339; G02F 1/133; G02F 1/13; G02F 1/1341
(52) U.S. Cl. ................ 349/154; 349/73; 349/155; 349/187; 349/189
(58) Field of Search .................. 349/73, 187, 189, 349/154–156

(56) References Cited

U.S. PATENT DOCUMENTS

| 5,410,423 A | * | 4/1995 | Furushima et al. ......... 349/190 |
| 5,677,749 A | * | 10/1997 | Tsubota et al. ............ 349/160 |
| 6,095,203 A | * | 8/2000 | Yamamoto et al. ........... 141/59 |
| 6,099,672 A | * | 8/2000 | Yamazaki et al. .......... 156/109 |
| 6,137,559 A | * | 10/2000 | Tanaka et al. ............. 349/153 |
| 6,195,149 B1 | * | 2/2001 | Kodera et al. ............. 349/187 |
| 6,285,434 B1 | * | 9/2001 | Ma et al. .................... 349/189 |

FOREIGN PATENT DOCUMENTS

JP  10-319416 A  * 12/1998

* cited by examiner

Primary Examiner—Tarifur R. Chowdhury
(74) Attorney, Agent, or Firm—Morgan, Lewis & Bockius LLP

(57) ABSTRACT

A liquid crystal display device includes a thin film transistor substrate, on which a plurality of data lines and gate lines are positioned perpendicular to each other; a plurality of pixel electrodes formed near intersections of the data lines and the gate lines; a color filter substrate positioned parallel to the thin film transistor substrate, including a color filter layer, a black matrix and a common electrode formed thereon; a polymer wall arrangement formed either on the thin film transistor substrate or on the color filter substrate dividing the substrate into a plurality of liquid crystal panels; and at least one liquid crystal injection opening formed on each panel of the plurality of liquid crystal panels.

19 Claims, 4 Drawing Sheets

LIQUID CRYSTAL DISPLAY DEVICE HAVING INJECTION PORTS AND LIQUID CRYSTAL INJECTION METHOD

This application claims the benefit of Korean Patent Application No. 61968/2000, filed in Korea on Oct. 20, 2000, which is hereby incorporated by reference.

BACKGROUND OF THE INVENTION

1. Field of the Invention

The present invention relates to a liquid crystal display device, and more particularly to a liquid crystal display device and a liquid crystal injection method in which a polymer wall is placed in the inside of a large panel and liquid crystal injection openings are formed on each of smaller panels created by a polymer wall, in order to simultaneously inject a liquid crystal in each opening.

2. Discussion of the Related Art

As shown in FIG. 1, a liquid crystal display device comprises a color filter substrate 10 and a thin film transistor (TFT) substrate 20, which are positioned parallel to each other at the top and bottom, respectively, of the liquid crystal display device. A sealed liquid cell that contains the liquid crystal surrounds the substrate 10. The liquid crystal display, using a property of liquid crystal having dielectric anisotropy, exhibits characters, numbers, and other optional designs. Such an arrangement has been widely used for display panel sections of electronic equipment such as watches.

The color filter substrate 10 includes a transparent substrate 11, a color filter layer 12 and a black matrix (BM) film 13 formed on the inside of the transparent substrate 11. Furthermore, a common electrode 14 made of ITO material is formed abutting the color filter layer 12 and the BM film 13.

The TFT substrate 20 comprises a plurality of gate bus lines 22 and data bus lines 23 formed on the inside of a lower transparent substrate 21. A plurality of switching elements shown as TFTs 24 are positioned close to the intersections of the gate bus lines 22 and the data bus lines 23. A plurality of square-shaped pixel electrodes 25 are surrounded by the gate bus lines 22 and the data bus lines 23 and are connected to the drain electrodes of the TFTs 24.

Well-known liquid crystal injection methods of a liquid crystal display include an injection method using a capillary effect and an induction method using a vacuum.

As an example of injection methods, a DIP method in which liquid crystal is injected inside of a panel using a capillary effect is shown in FIG. 2. Referring to FIG. 2, the DIP method comprises a first process of generating a vacuum in a vacuum chamber 1; a second process of pressing a liquid crystal 1b of a liquid crystal container (LC container) 1c in the vacuum chamber 1 to an injection opening (not shown) of a liquid crystal 1a cell, after the vacuum is generated in the vacuum chamber 1; a third process of injecting the liquid crystal 1b of the LC container 1c in the liquid crystal cell 1a by a capillary effect; the pressure difference between the inside of the liquid crystal cell 1a and that of the vacuum chamber 1 causes the pressure of the vacuum chamber 1 to increase to atmospheric pressure; and, a fourth process of separating the LC container 1c when all of the liquid crystal 1b is injected into the liquid crystal cell 1a.

In other words, according to the liquid crystal injection method described above, a vacuum is generated in the vacuum chamber 1, and a guidance section of the LC container 1c on the inside of the vacuum chamber 1 and an injection opening of the liquid crystal cell 1a are joined by applying a certain degree of pressure.

When the liquid crystal of the LC container 1c and the injection opening of the liquid crystal cell 1a are combined, the liquid crystal 1b of the LC container 1c is injected inside of the liquid crystal cell 1a by a capillary effect and by the pressure difference between the inside of the liquid crystal cell 1a and the vacuum chamber 1. Once all of the liquid crystal 1b is injected in the liquid crystal cell 1a, the LC container 1c is separated and the liquid crystal injection process is complete.

As stated above, the vacuum is generated in the vacuum chamber 1 before the liquid crystal cell 1a and the LC container 1c are combined and the liquid crystal 1b is injected in the liquid crystal cell 1a by a capillary effect and by the pressure difference between the inside of the liquid crystal cell 1a and the vacuum chamber 1.

However, there is a problem in the liquid crystal injection method employing the aforementioned capillary effect and pressure difference in that the liquid injection time is increased as a panel is enlarged. Namely, a large-scale panel and narrow cell spacing require a great deal of effort, especially during the injection process, and as a result, productivity is relatively low.

In order to overcome the problems in the liquid crystal injection method using such capillary action, methods including lowering the viscosity of the liquid crystal (heating) or increasing the pressure difference inside the panel have been utilized.

As shown in FIG. 3, an injection opening and exhaust openings are formed in a panel 10 placed inside a heating/pressing chamber 80. An injection connector 11 is connected to the injection opening and exhaust connectors 12 are connected to the exhaust openings. First to ninth valves 51–59 function to open and close pipe 70, and traps 41 and 42 function to prevent reverse-flow.

In addition, in order to pump the inside of the panel 10 using a first pump 21, the seventh valve 57 and the third valve 53 are closed, whereas the first valve 51, the second valve 52 and the fourth valve 54 are opened, respectively, making the inside of the panel a high vacuum state by using the first pump 21.

Next, the first valve 51 connected to the injection connector 11 is closed in order to maintain the high vacuum state, and the third valve 53 connected to a deformation pressing tank 30 is opened and then pumped in order to defoam the liquid crystal inside of the defoamation pressing tank 30.

In this state, by opening the first valve 51, the seventh valve 57 and the eighth valve 58, and adding pressure on the outside of the defoamation pressing tank 30, the liquid crystal inside of the tank is injected through the third valve 53, the first valve 51 and the injection connector 11.

The mechanical relation according to the method described above is as follows: $V \propto \Delta P/\eta$, wherein, V is an injection speed; $\Delta P$ is a pressure difference between a panel and a chamber; and, $\eta$ is viscosity of liquid crystal. Here, the liquid crystal injected into the panel 10 is induced through an exhaust connector 12 according to the second pump 22. That is, the injection connector 11 is for injecting liquid crystal, and the exhaust connector 12 is for taking in the liquid crystal resulting in the reduction of liquid crystal injection time.

Unfortunately, the injection-exhaust method shown in FIG. 3 has several problems in that during a whole period of liquid crystal injection time in a large-scale panel, an exhaust section should be continuously opened. Thus, if chemically volatile material is included in the liquid crystal, then such material easily evaporates through the open exhaust connector. Further, since the injection speed is forced to speed up, it is always possible to damage the surface of an alignment layer due to a flow of liquid crystal.

SUMMARY OF THE INVENTION

Accordingly, the present invention is directed to a liquid crystal display and liquid crystal injection method that substantially obviate one or more of the problems due to limitations and disadvantages of the related art.

An object of the present invention to provide a liquid crystal display device and injection method for reducing liquid crystal injection time by forming polymer walls to make small panels, where a liquid crystal injection opening is assigned to each panel, and through a connector combining each injection opening and liquid crystal supply section, every small panel is at a high vacuum state for liquid crystal to be injected.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display device includes a thin film transistor substrate, on which a plurality of data lines and gate lines are positioned perpendicular to each other; a plurality of pixel electrodes formed near intersections of the data lines and the gate lines; a color filter substrate positioned parallel to the thin film transistor substrate, including a color filter layer, a black matrix and a common electrode formed thereon; a polymer wall arrangement formed either on the thin film transistor substrate or on the color filter substrate dividing the substrate into a plurality of liquid crystal panels; and at least one liquid crystal injection opening formed on each panel of the plurality of liquid crystal panels.

In another aspect, the liquid crystal injection method according to the present invention includes forming a polymer wall an arrangement on a substrate; dividing the substrate into a plurality of liquid crystal panels by the polymer wall arrangement; connecting a plurality of liquid crystal injection openings and liquid crystal supply sections to the plurality of liquid crystal panels; generating a vacuum inside at least one panel of the plurality of liquid crystal panels by pumping through at least one liquid crystal injection opening of the plurality of liquid crystal injection openings to create a high vacuum state in the panel; defoaming liquid crystal in a defoamation pressing tank; and injecting the liquid crystal from the defoamation pressing tank to the panel through at least one liquid crystal injection opening of the plurality of liquid crystal injection openings.

In yet another aspect, the liquid crystal injection method according to the present invention includes arranging a thin film transistor substrate parallel to a color filter substrate, wherein the color filter substrate has a color filter layer, a black matrix and a common electrode; foaming a polymer wall arrangement, either on the thin film transistor substrate or on the color filter substrate, which divides the substrate into a plurality of smaller liquid crystals panels; forming a liquid crystal injection opening on each of the small liquid crystal panels; generating a vacuum inside of the substrate by pumping the liquid crystal injection openings; defoaming a liquid crystal inside of a defoamation pressing tank; and injecting the liquid crystal from the tank into the substrate through at least one of the liquid crystal injection openings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
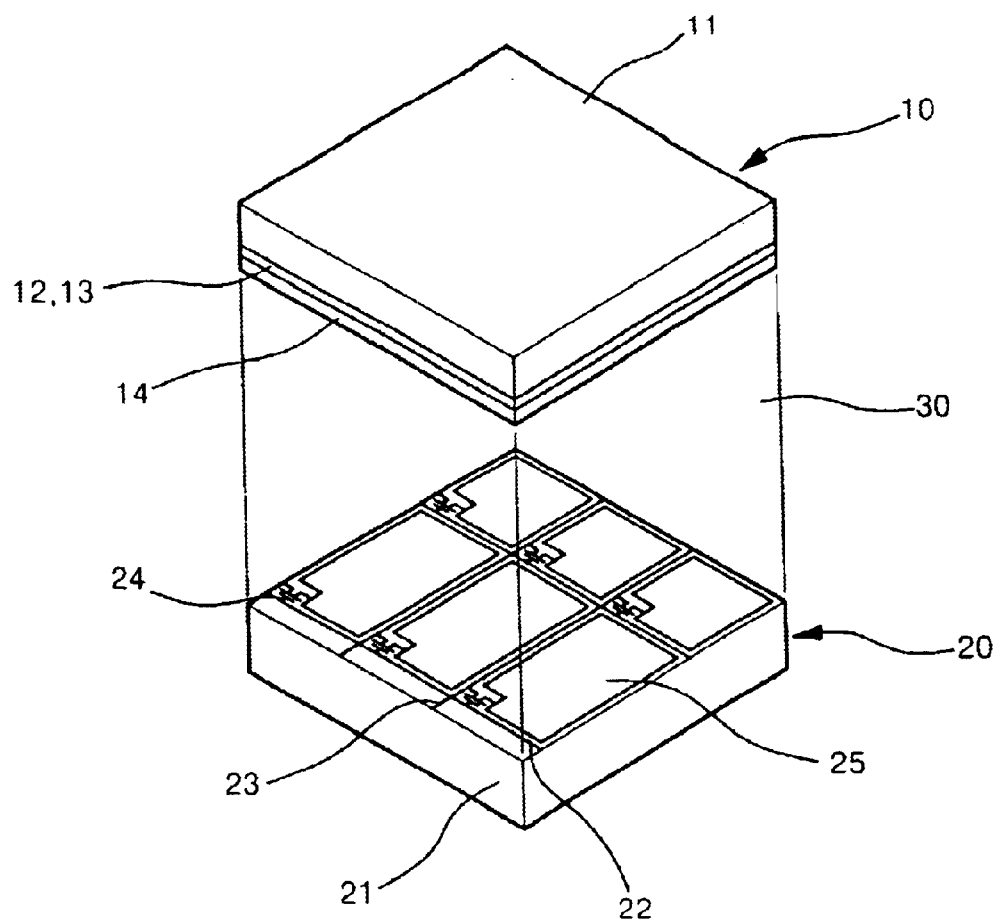
FIG. 1 is a systematic diagram illustrating a related art liquid crystal display device.
Figure 2:
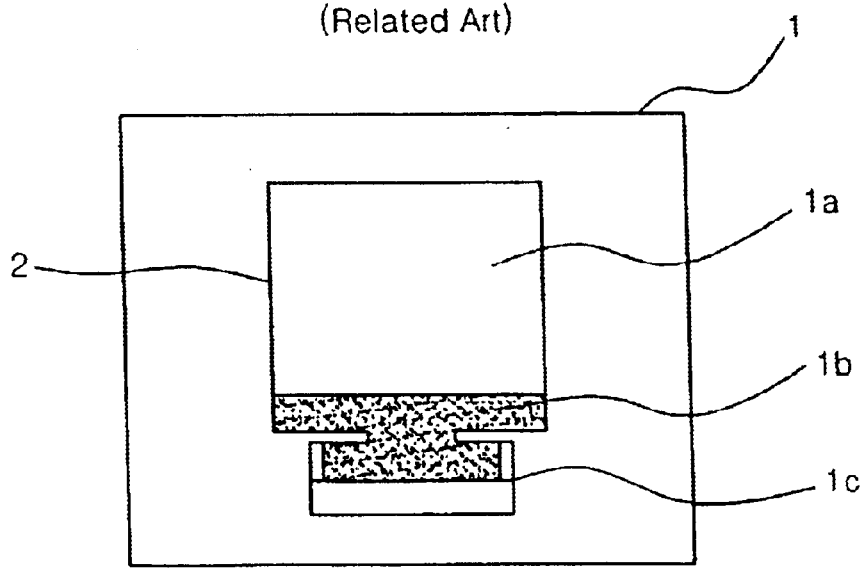
FIG. 2 illustrates a related art liquid crystal injection method using a conventional capillary effect and pressure difference processes.
Figure 3:
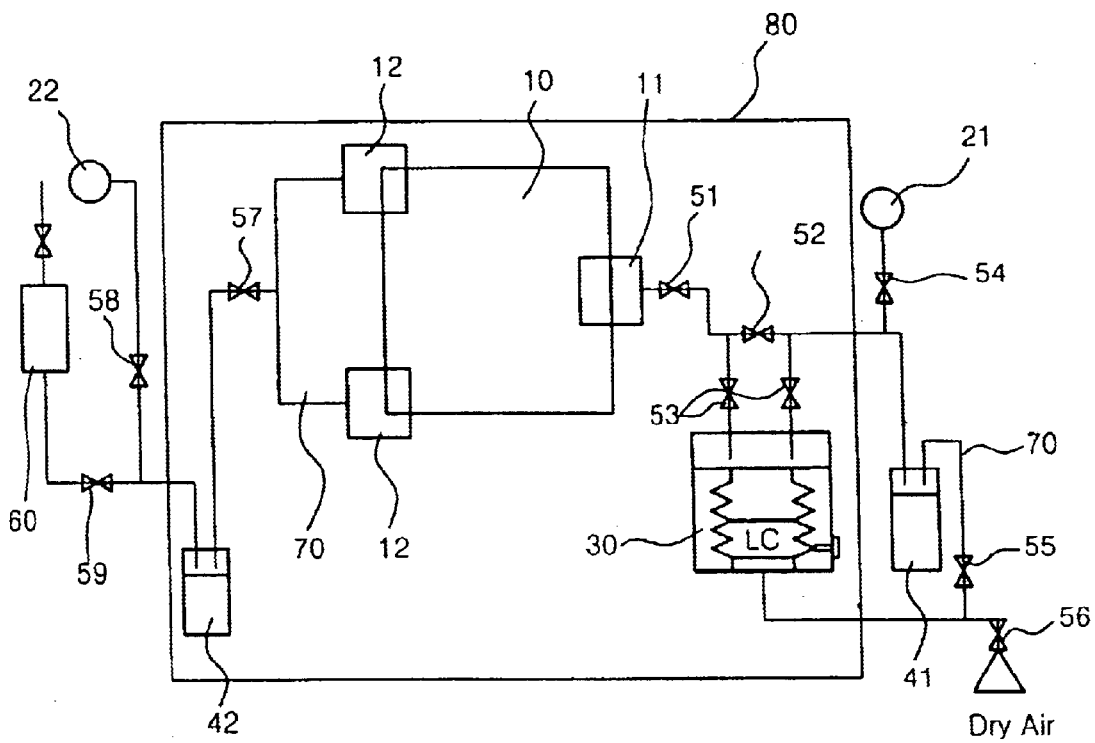
FIG. 3 illustrates a related art arrangement for carrying out a liquid crystal injection method based on a conventional induction method.
Figure 4:
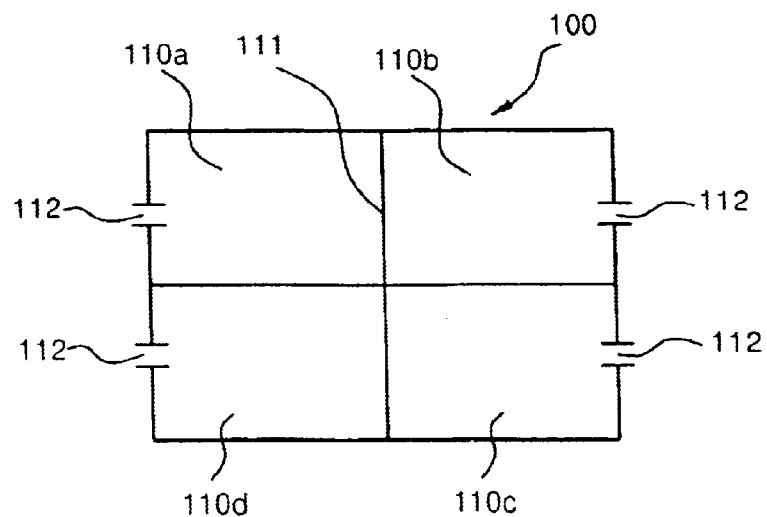
FIG. 4 illustrates a panel divided into small size panels for a liquid crystal injection method according to the preferred embodiment of the present invention.
Figure 5:
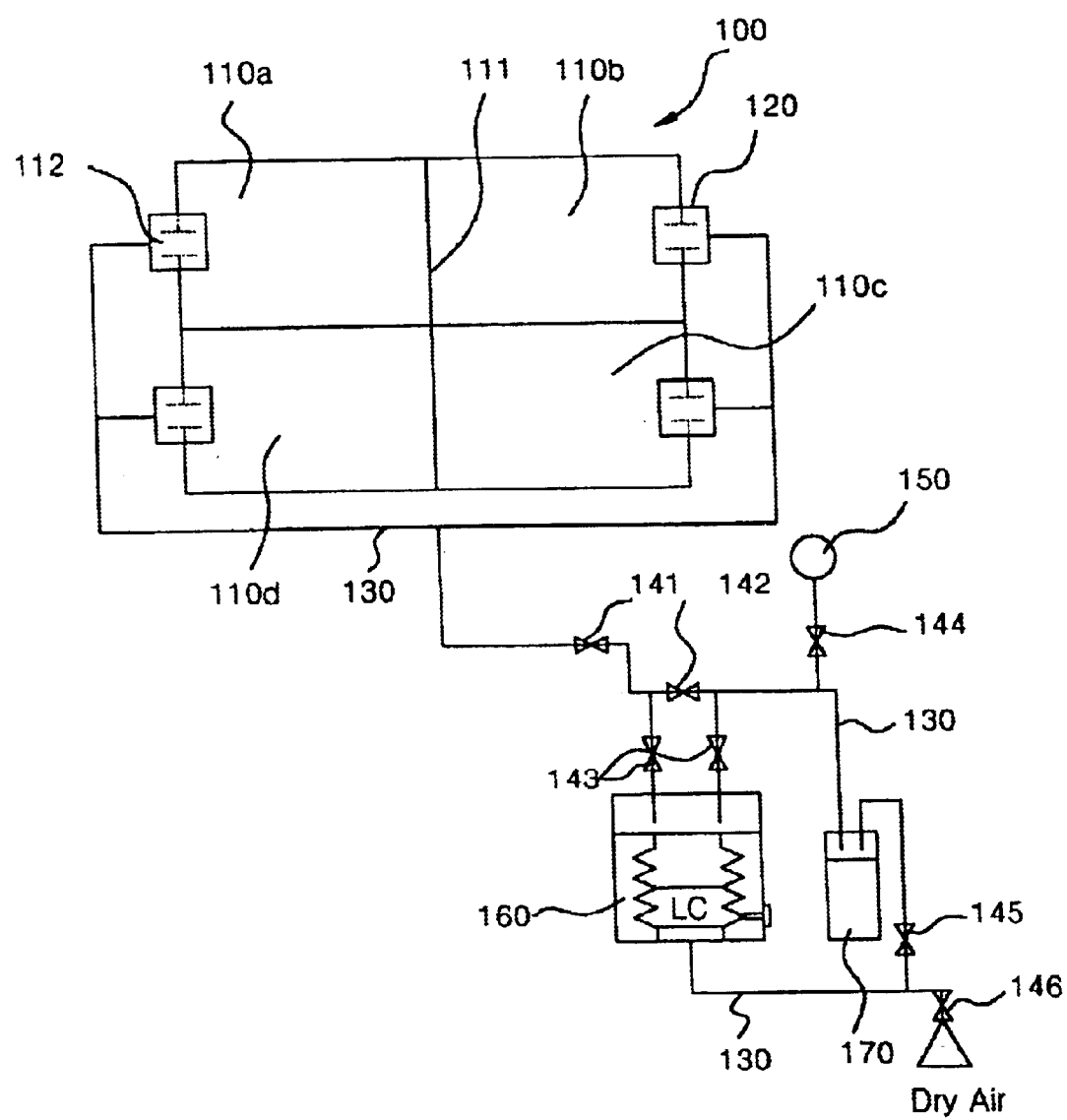
FIG. 5 illustrates an arrangement for carrying out a liquid crystal injection method according to the preferred embodiment of the present invention.
Figure 6:
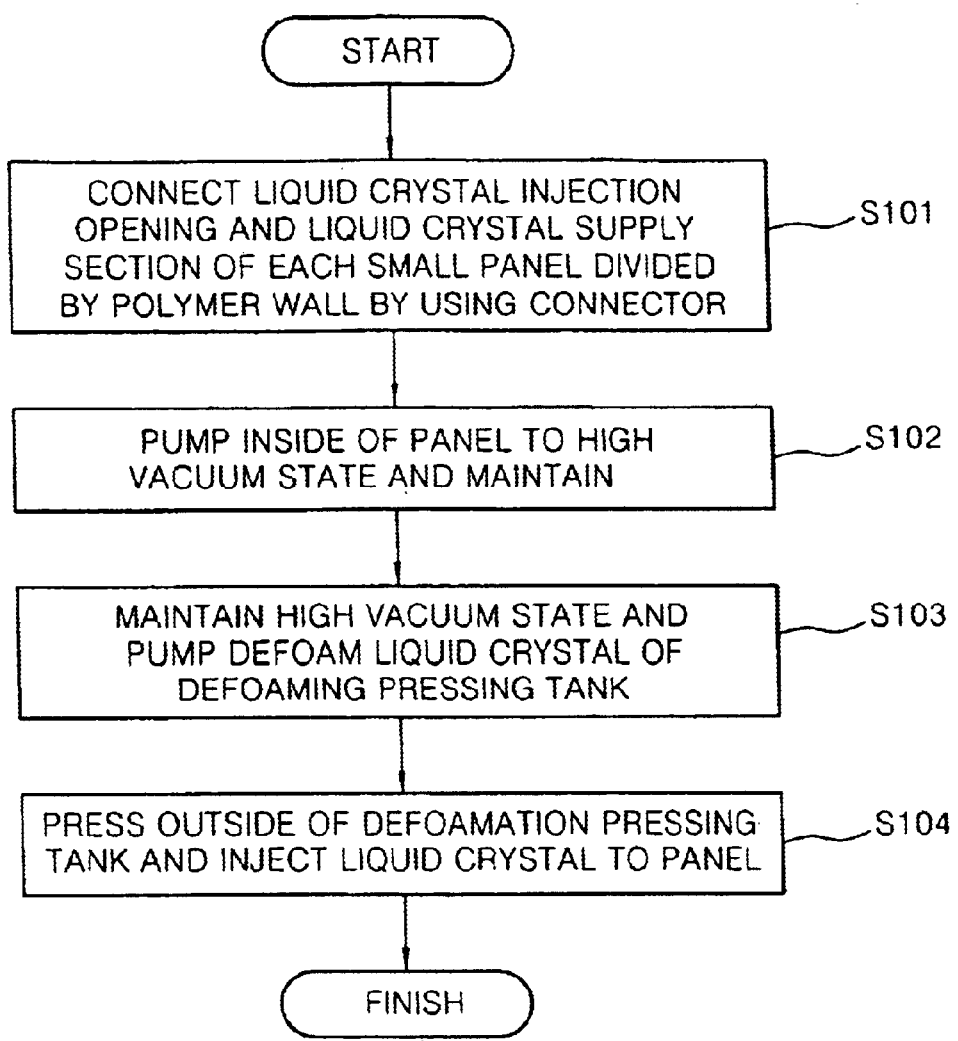
FIG. 6 is a flow chart illustrating a liquid crystal injection method according to the preferred embodiment of the present invention.

FIG. 4 illustrates a panel divided into smaller size panels for carrying, out a liquid crystal injection method according to the preferred embodiment of the present invention. FIG. 5 illustrates an arrangement for carrying out a liquid crystal injection method according to the preferred embodiment of the present invention. FIG. 6 is a flow chart illustrating a liquid crystal injection method according to the preferred embodiment of the present invention.

Referring first to FIG. 4, a polymer wall 111 is provided inside of a large panel 100 to divide the panel 100 into small panels 110a–110d, and a liquid crystal injection opening 112 is set up in the outside of each small panel for liquid crystal injection.

As shown in FIG. 5, there is a connector 120 for connecting an injection opening 112 and a liquid crystal supply section formed on each small panel 110a–110d, first to sixth valves 141–146 for opening/closing of a pipe 130, and a defoamation pressing tank 160 for exhausting liquid crystal through the pipe 130 by adding pressure, a trap 170 for preventing a reverse-flow. In this arrangement and methodology, dry air is injected to press the defoamation pressing tank 160.

A liquid crystal display device and a liquid crystal injection method according to the preferred embodiments of the present invention are now explained with reference to particular drawings.

First of all, as shown in FIG. 4, the polymer wall 111 having a cross shape (+) is formed on either a color filter substrate or a TFT substrate, for example, in order to make a large panel 100 smaller, thereby dividing the large panel with the polymer wall 111 into a number of small panels 110a–110d.

Here, the polymer wall 111 functions as a spacer to maintain a space between cells and separates the small panels 110a–110d from one another. As for the inside of every small panel 110a–110d, a polymer-patterned spacer is formed or a bead spacer is spread, for example, to maintain a regular space between cells on a color filter substrate and a TFT substrate of a liquid crystal display device.

Preferably, a polymer-patterned spacer in each separated panel is used because if the bead spacer is spread, it might climb up the cross-shaped polymer wall 111.

The polymer wall is preferably made of a scaling agent-like material, and possibly more than one polymer wall is formed parallel to a side of the large panel 100.

The large panel 100 may be divided into 4 small panels 110a–d, as shown in FIG. 4.

Then, the liquid injection openings 112 may assigned to each of the small panels 110a–110d, and thereafter the liquid crystal is injected through pressurization after a high vacuum state is established therein.

Referring to FIG. 5, in order to supply liquid crystal to an injection opening 112 on partially paneled small panels 110a–110d, respectively, a connector 120 is used to connect a liquid crystal supply section and a liquid crystal injection opening 112. Regarding the connector 120, a connector made in Beldex Co. of Japan has been commercially used.

A vacuum is generated inside of the panel (approximately $10^{-6}$ torr) by closing the third valve 143 connected to a defoamation pressing tank 160 and directly pumping by pump 150 the inside of the panel connected to the connector 120. At this time, the first, second, and fourth valve 141, 142, and 144 remain opened.

Since pumping is conducted directly to each small panel 110a–110d connected to the connector 120, the time required for pumping is greatly reduced when compared to a time required for pumping an entire large panel.

In addition, to maintain the inside of the small panels 110a–110d at a certain degree of vacuum state (approximately $10^{-6}$ torr), the first valve 141 is closed while the third valve 143 is left open, and then a defoamation pressing tank 160 is pumped to defoam the liquid crystal inside of the tank. To prevent any chemical components in the liquid crystal from being volatilized, the tank should be pumped at a lower vacuum level than that of the inside of the small panels, for example, approximately from $10^{-3}$ torr.

In other words, although the pumping of the small panel inside and defoaming liquid crystal can be performed simultaneously, they are preferably performed separately in order to prevent the loss of any volatile chemical components in the liquid crystal due to the high vacuum level in the panel.

After pumping the panel and defoaming, the liquid crystal, the fourth valve 144 connected to a pump 150 is closed, and the first valve 141 that was closed during the defoamation procedure is opened. And, by pressing the outside of the defoamation pressing tank 160 using dry air, the liquid crystal from the tank is successfully injected into each of the small panels 110a–110d. At this time, the first to third valves 141–143, and the sixth valve 146 remain open.

A liquid crystal injection method according to the liquid crystal injection device shown in FIG. 5 is explained by the flowchart of FIG. 6. In step S101, liquid crystal is injected to small panels 110a–110d that are formed by dividing a large panel 100 into smaller sized panels using a polymer wall arrangement 111, each small panel having a liquid crystal injection opening 112 and a liquid crystal supply section connected through a connector 120.

Following the step S101, the inside of each small panel 110a–110d is pumped to establish a high vacuum state, and, when the vacuum level of the inside of the panel reaches a certain level, the first valve 141 is closed to maintain the high vacuum level in step S102.

Then, in step S103, the third valve 143 connected to a defoamation pressing tank 160 is opened, and the tank is pumped to defoam the liquid crystal inside (S103). Here, the pumping should be conducted such that the vacuum level inside the tank is maintained at a level lower than that of the small panel.

After pumping and defoaming the small panels 110a–110d, step S104 is performed in which the fourth valve 144 connected to the pump is closed, and the first valve 141 that was closed during the defoamation is opened, and, by pressing the outside of the defoamation pressing tank 160, the liquid crystal inside the tank is injected in each small panel 110a–110d through a connector 120. Finally, bagging the injection opening 112 of the large panel 100 followed by a cleaning process completes the liquid crystal injection process.

In this manner, the large panel 100 is divided into small panels 100a–100d by using the polymer wall arrangement 111. For example, four panels are formed if a cross polymer wall is employed, and 3 panels are formed if two parallel polymer walls are employed. Then, the liquid crystal is injected in each small panel at the same time, which consequently reduces the liquid crystal injection time and improves shock resistance by using a cross-shaped polymer wall.

In conclusion, according to the present invention, the polymer wall is formed on a color filter substrate or a TFT substrate inside of a large panel in order to divide the large panel into small size panels. And, a spacer or a polymer-patterned spacer is spread on each small panel between the polymer walls to regulate the space between the color filter substrate and the TFT substrate. A connector is connected to a liquid injection opening formed on each small panel, which serves to raise the vacuum level inside of each panel and to inject liquid crystal through each injection opening at the same time. Therefore, the liquid crystal injection time is greatly reduced, and shock resistance due to the polymer wall inside of the panel is improved also.

It will be apparent to those skilled in the art that various modifications and variations can be made in the liquid crystal display device and liquid crystal injection method of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a thin film transistor substrate, on which a plurality of data lines and gate lines are positioned perpendicular to each other;
   a plurality of pixel electrodes formed near intersections of the data lines and the gate lines;

a color filter substrate including a color filter layer, a black matrix and a common electrode bonded to the thin film transistor substrate;

a polymer wall arrangement formed on one of the thin film transistor substrate and the color filter substrate dividing the substrate into a plurality of liquid crystal panels; and a plurality of liquid crystal injection openings formed on edge portions of the bonded color filter and thin film transistor substrates, wherein each of the plurality of liquid crystal injection openings are arranged along vertical and horizontal line directions and correspond to each one of the plurality of liquid crystal panels.

2. The device of claim 1, wherein at least two liquid crystal injection openings are formed.

3. The device of claim 1, wherein the polymer wall arrangement is formed of a material such as a sealing agent.

4. The device of claim 1, wherein the polymer wall arrangement has a cross shape.

5. The device of claim 1, wherein the polymer wall arrangement comprises at least one polymer wall which is formed parallel to a side of the thin film transistor substrate or the color filter substrate.

6. The device of claim 1, wherein the polymer wall arrangement is formed close to the black matrix.

7. A liquid crystal injection method, comprising:

forming a polymer wall arrangement between bonded first and second substrates;

dividing the bonded first and second substrates into a plurality of liquid crystal panels by the polymer wall arrangement;

connecting a plurality of liquid crystal injection openings formed on edge portions of the bonded first and second substrares and liquid crystal supply sections to the plurality of liquid crystal panels;

generating a vacuum inside at least one panel of the plurality of liquid crystal panels by pumping through at least one liquid crystal injection opening of the plurality of liquid crystal injection openings to create a high vacuum state in the panel;

defoaming liquid crystal in a defoamation pressing tank; and injecting the liquid crystal from the defoamation pressing tank to the panel through at least one liquid crystal injection opening of the plurality of liquid crystal injection openings, wherein each of the plurality of liquid crystal injection openings are arranged alone vertical and horizontal line directions.

8. The method of claim 7, wherein the vacuum level inside of the plurality of liquid crystal panels is higher than that of the defoamation depressing tank after the pumping is performed.

9. The method of claim 7, wherein the vacuum level inside of the plurality of liquid crystal panels is about $10^{-6}$ torr.

10. The method of claim 7, wherein the vacuum level inside of the defomation pressing tank is about $10^{-3}$ torr.

11. The method of claim 7, wherein the substrate is one of a thin film transistor substrate and a color filter substrate.

12. The method of claim 7, further comprising forming the polymer wall arrangemeifl of a material such as a sealing agent.

13. The method of claim 7, wherein the polymer wall arrangement has a cross shape.

14. The method of claim 7, further comprising forming the polymer wall arrangement close to a black matrix.

15. A method for manufacturing a liquid crystal display device, comprising:

forming a polymer wall arrangement, on one of a thin film transistor substrate and a color filter substrate, to provide a plurality of smaller liquid crystal panels;

forming a plurality of liquid crystal injection openings along edge portions of the one of the thin film transistor substrate and color filter substrate, corresponding to each of the smaller liquid crystal panels;

bonding the thin film transistor substrate to the color filter substrate;

generating a vacuum inside of the bonded substrates by pumping the liquid crystal injection openings;

defoaming a liquid crystal inside of a defoaxnation pressing tank; and injecting the liquid crystal from the tank into the bonded substrates through at least one of the liquid crystal injection openings, wherein each of the plurality of liquid crystal injection openings are arranged along vertical and horizontal line directions.

16. The method of claim 15, further comprising forming a spacer in the substrate.

17. The method of claim 15, further comprising forming the polymer wall arrangement of a material such as a sealing agent.

18. The method of claim 15, wherein the polymer wall arrangement has a cross shape.

19. The method of claim 15, further comprising forming the polymer arrangement close to a black matrix.

* * * * *